(12) United States Patent
Weh et al.

(10) Patent No.: US 12,060,869 B2
(45) Date of Patent: Aug. 13, 2024

(54) VEHICLE HYDRAULIC BRAKE UNIT HAVING A CYLINDER BORE AND PISTON WITH ROTATION PREVENTION PARTS

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 17/440,370

(22) PCT Filed: Mar. 18, 2020

(86) PCT No.: PCT/EP2020/057480
§ 371 (c)(1),
(2) Date: Sep. 17, 2021

(87) PCT Pub. No.: WO2020/224846
PCT Pub. Date: Nov. 12, 2020

(65) Prior Publication Data
US 2022/0163023 A1 May 26, 2022

(30) Foreign Application Priority Data
May 9, 2019 (DE) .......................... 102019206754.9

(51) Int. Cl.
*F04B 17/03* (2006.01)
*F04B 53/16* (2006.01)
(Continued)

(52) U.S. Cl.
CPC .............. *F04B 17/03* (2013.01); *F04B 53/16* (2013.01); *B60T 13/745* (2013.01); *B60T 17/02* (2013.01); *F04B 9/02* (2013.01); *F04B 19/22* (2013.01)

(58) Field of Classification Search
None
See application file for complete search history.

(56) References Cited

U.S. PATENT DOCUMENTS 1,963,355 A * 6/1934 Davis ........................ C21D 9/32
219/50
5,788,341 A * 8/1998 Penrod .................... B60T 8/326
303/3

(Continued)

FOREIGN PATENT DOCUMENTS

DE 102014225590 A1 6/2016
DE 102017211874 A1 1/2019
(Continued)

OTHER PUBLICATIONS

International Search Report for PCT/EP2020/057480, Issued Jun. 4, 2020.

*Primary Examiner* — Essama Omgba
*Assistant Examiner* — Timothy P Solak
(74) *Attorney, Agent, or Firm* — NORTON ROSE FULBRIGHT US LLP; Gerard A. Messina

(57) ABSTRACT

A semicircular rotation prevention part for preventing rotation of a piston of a hydraulic unit of an externally-powered hydraulic vehicle brake system. The rotation prevention part is positioned in a congruent widened section at a mouth of a cylinder bore of a hydraulic block of the hydraulic unit and includes axially parallel rotation prevention grooves on its inner circumference, with which shoulders projecting outwards from the piston engage.

15 Claims, 4 Drawing Sheets

(51) Int. Cl.
     *B60T 13/74*      (2006.01)
     *B60T 17/02*      (2006.01)
     *F04B 9/02*       (2006.01)
     *F04B 19/22*      (2006.01)

(56) References Cited

U.S. PATENT DOCUMENTS

| | | | |
|---|---|---|---|
| 6,352,018 B1* | 3/2002 | Krisher | B60T 13/745 |
| | | | 92/140 |
| 10,941,764 B2* | 3/2021 | Ohm | F16H 25/20 |
| 2017/0259799 A1* | 9/2017 | Weh | F04B 9/02 |
| 2018/0029575 A1* | 2/2018 | Malwitz | F16D 65/14 |
| 2018/0345934 A1* | 12/2018 | Weh | F04B 17/03 |

FOREIGN PATENT DOCUMENTS

| | | |
|---|---|---|
| DE | 102017214593 A1 | 2/2019 |
| WO | 2019076548 A1 | 4/2019 |

\* cited by examiner

VEHICLE HYDRAULIC BRAKE UNIT HAVING A CYLINDER BORE AND PISTON WITH ROTATION PREVENTION PARTS

FIELD

The present invention relates to a hydraulic unit for a hydraulic vehicle brake system. The hydraulic unit is intended to build up brake pressure for externally-powered braking and/or to build up brake pressure and/or to convey brake fluid for a traction control system. Traction control systems include antilock, drive slip and/or vehicle dynamics control systems/electronic stability programs, for which the abbreviations ABS, TCS and/or ESP are customary. Vehicle dynamics control systems/electronic stability programs are also colloquially referred to as skid protection systems. Traction control systems are conventional and are not explained here.

BACKGROUND INFORMATION

German Patent Application No. DE 10 2017 214 593 A1 describes a hydraulic unit for an externally-powered vehicle brake system, including a hydraulic block, which is in the shape of a right parallelepiped and has a cylinder bore, in which a piston is received so as to be axially displaceable. An electric motor is attached to the hydraulic block at a mouth of the cylinder bore; the piston being able to be displaced by the electric motor in the cylinder bore of the hydraulic block, via a worm gear. The worm gear is situated between the electric motor and the piston.

A brake pressure may be generated and/or brake fluid may be conveyed by displacing the piston in the cylinder bore. Using solenoid valves, which are positioned on and/or in the hydraulic block, the brake pressure may be controlled; and/or, in order to control slip, wheel brake pressures in hydraulic wheel brakes, which are connected to the hydraulic block via brake lines, may be controlled.

To prevent the piston from rotating, the conventional hydraulic block has three cylindrical pins, which are positioned axially parallelly to the cylinder bore, on an inner circumference of the cylinder bore, distributed over the circumference, such that they project inwards by approximately one half of their diameter. At one end facing the electric motor, a ring, which encircles the piston, is put on the piston. The ring includes three studs, which project inwards, jut into complementary recesses of the piston, and thereby hold the ring on the piston in a rotatably fixed manner; and three semicircular recesses at its circumference, with which the cylindrical pins engage, so that the piston is supported by the cylinder pins and the ring in an axially displaceable and rotatably fixed manner.

SUMMARY

The hydraulic unit of the present invention is intended to build up brake pressure for externally-powered braking and/or to build up brake pressure and/or to convey brake fluid for a traction control system. The hydraulic unit may be part of a hydraulic, muscle-powered or power-assisted vehicle brake system, in which the hydraulic unit is used to control slip, or part of an externally-powered hydraulic vehicle brake system, in which the hydraulic unit is used to build up brake pressure for externally-powered braking and, preferably, to also build up brake pressure and convey brake fluid for a traction control system.

In accordance with an example embodiment of the present invention, the hydraulic unit of the present invention includes a hydraulic block, which has, in particular, the shape of a right parallelepiped and is made, in particular, of metal, for example, an aluminum alloy. The hydraulic block is used for mechanically attaching and hydraulically connecting hydraulic and other components of the vehicle brake system, such as solenoid valves, check valves, hydraulic reservoirs, and/or damping chambers. "Hydraulically connecting" means hydraulically connecting the hydraulic components in accordance with a hydraulic circuit diagram of the vehicle brake system. The hydraulic components are used for regulating brake pressure, where "regulating" includes controlling.

The hydraulic block of the hydraulic unit according to an example embodiment of the present invention includes a cylinder bore, in which a piston is guided in an axially displaceable manner. The piston may be guided directly in the cylinder bore without a cylinder bushing, in an axially displaceable manner, or in a cylinder bushing or the like, which is situated in the cylinder bore of the hydraulic block. "Cylinder bore" is not to be understood to mean that it has to be produced by boring, but it may be produced in any manner desired. "Cylinder bore" means a cylindrical space, in which the piston is axially displaceable, in which a brake pressure may be generated by displacing the piston, and/or out of which or into which brake fluid may be expelled or aspirated by displacing the piston.

The hydraulic block includes an electric motor and a worm gear, which converts angular motion of the electric motor to linear displacement, so that the piston may be axially displaced by the electric motor in the cylinder bore of the hydraulic block via the worm gear. A mechanical reduction gear may be interposed between the electric motor and the worm gear. The electric motor is situated at a mouth of the cylinder bore, preferably externally, on a side of the hydraulic block.

To prevent the piston from rotating, an example embodiment of the present invention provides a rotation prevention part, which encircles the piston on a part of its circumference. For example, the rotation prevention part includes a cross section, which has the shape of a graduated circular ring and preferably extends over more than half of the circumference and/or less than three quarters of the circumference of the piston. The cross section of the rotation prevention part is preferably constant in the axial direction of the rotation prevention part.

The rotation prevention part is situated in a widened section of the cylinder bore, on and/or in a mouth of the cylinder bore; the widened section extending over at least the same portion of the circumference of the piston and/or of the cylinder bore as the rotation prevention part. In particular, a cross section of the widened section is congruent to the cross section of the rotation prevention part, that is, it extends equally far in the circumferential direction as the latter. The widened section of the cylinder bore at its mouth is, for example, an annular step, which extends over a part of the circumference of the cylinder bore. The rotation prevention part may or may not be axially longer than the widened section is deep and protrude from the widened section. The rotation prevention part is held in a rotatably fixed manner in the widened section in the mouth of the cylinder bore by a form-locked connection, which means that it may not move or, at most, move in a limited manner, in the circumferential direction.

The rotation prevention part includes a rotation prevention element, which runs in a longitudinal direction of the cylinder bore, and on which a counter-element of the piston is supported in the circumferential direction, which means that the piston is held in a rotatably fixed manner and is axially displaceable. To be sure, a limited ability of the piston to rotate is not intended per se, but is also not precluded. The rotation prevention element preferably runs axially parallelly, but a rotation prevention element, which, in addition to in the longitudinal direction, also runs in the circumferential direction of the cylinder bore, is not ruled out, for example, a helical rotation prevention element.

It is preferable for the rotation prevention part to include a plurality of rotation prevention elements and for the piston to include a plurality of counter-elements, which are distributed uniformly or nonuniformly over the circumference.

The rotation prevention element may be, for example, a rotation prevention groove, which runs in the longitudinal direction of the cylinder bore and is on an inner circumference of the rotation prevention part, and with which a counter-element projecting outwards from the piston engages.

Further refinements and advantageous embodiments of the present invention are disclosed herein.

In specific embodiments of the present invention, all of the features revealed in the description and the figures may be implemented individually by themselves or, in principle, in any desired combination. Variants of the present invention, which do not include all of the features of an embodiment, but only one or more of them, are theoretically possible.

BRIEF DESCRIPTION OF THE DRAWINGS

In the following, the present invention is described in greater detail in light of a specific example embodiment shown in the figures.

DETAILED DESCRIPTION OF EXAMPLE EMBODIMENT

Figure 1:
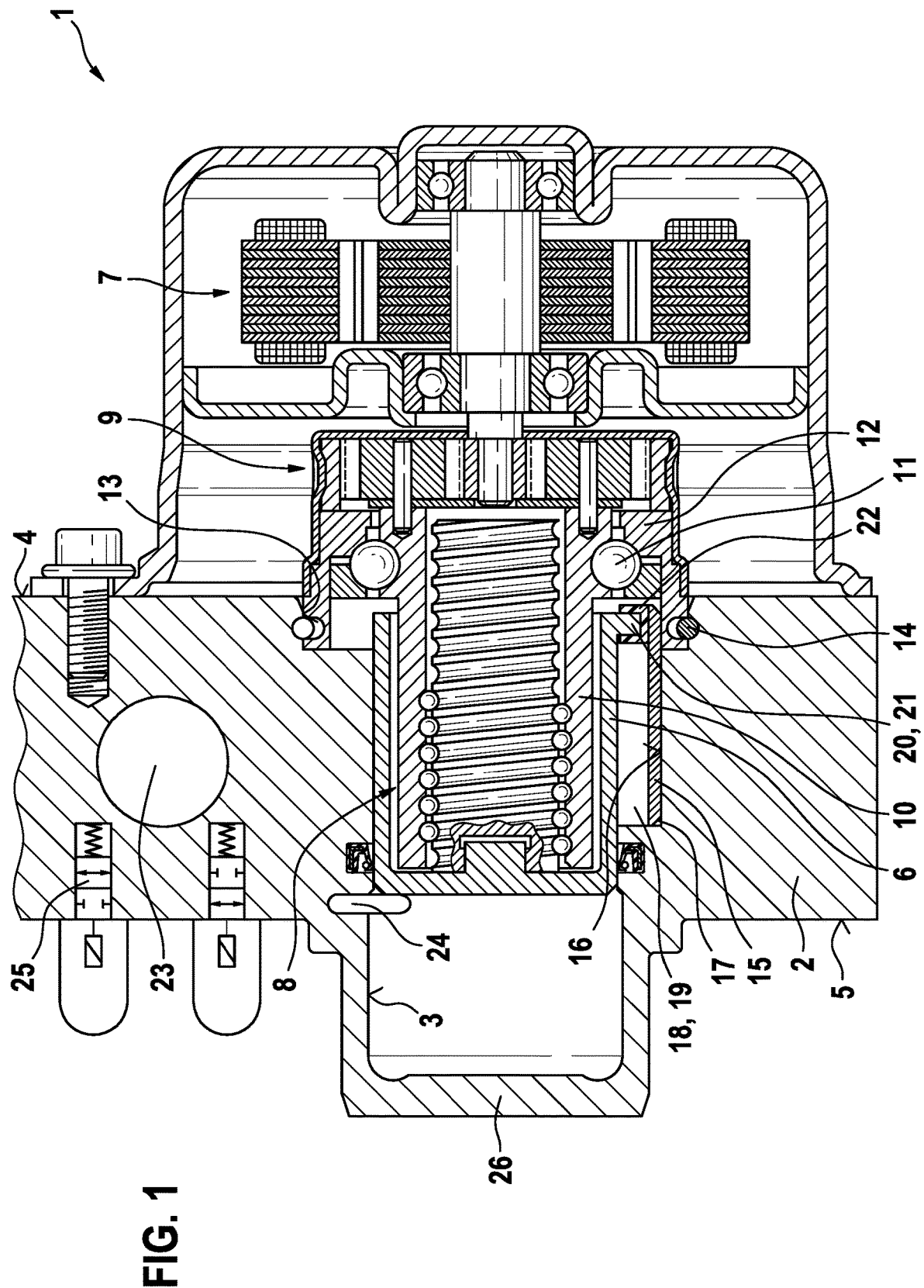
FIG. 1 shows an axial section of a cylinder bore of a hydraulic block of a hydraulic unit for a hydraulic vehicle brake system according to an example embodiment of the present invention.

The hydraulic unit 1 of the present invention, shown in the figure, is intended for generating pressure in an externally-powered, hydraulic vehicle brake system, for externally-powered braking and/or for generating pressure and for conveying brake fluid in a slip-controlled hydraulic vehicle brake system during the control of traction. Such traction control systems include, for example, antilock, drive slip and/or vehicle dynamics control systems/electronic stability programs, for which the abbreviations ABS, TCS and/or ESP are customary.

The hydraulic unit 1 of the present invention includes a hydraulic block 2, which is used for mechanically attaching and hydraulically connecting hydraulic and other components of the traction control system, such as solenoid valves, check valves, hydraulic reservoirs, and damping chambers. The components are situated on and in hydraulic block 1 and are hydraulically interconnected via an unshown bore of hydraulic block 2 in accordance with a hydraulic circuit diagram of the externally-powered, vehicle brake system and the traction control system. In the specific embodiment of the present invention shown and described, hydraulic block 2 is a flat metal block, which has the shape of a right parallelepiped, is made, for example, of an aluminum alloy, is provided with bores for receiving the components, and is bored according to the hydraulic circuit diagram of the vehicle brake system and the traction control system.

Hydraulic block 2 includes a hollow cylindrical space, which is referred to here as a cylinder bore 3 irrespectively of the method of its manufacture by boring or in any other desired manner. Cylinder bore 3 is open on a side of hydraulic block 2, which is referred to here as motor side 4. On an opposite side of hydraulic block 2 referred to here as valve side 5, a hollow cylindrical protuberance 26 of cylinder bore 3 projects beyond hydraulic block 2, which means that cylinder bore 3 is longer in an axial direction of cylinder bore 3 than hydraulic block 2 is thick. Cylinder bore 3 is closed on valve side 5. The projecting length beyond hydraulic block 2 due to protuberance 26 of cylinder bore 3 is not essential to the present invention. In the exemplary embodiment, protuberance 26 of cylinder bore 3 is a one-piece part of hydraulic block 2. For example, a cylinder bushing (not shown), which is situated in a through hole of hydraulic block 2, and whose interior forms the cylinder bore, is also possible.

A piston 6 is received in cylinder bore 3 so as to be axially displaceable. In the exemplary embodiment, piston 6 is a cylindrical tube-shaped hollow piston having a closed and an open end. The closed end of piston 6 faces the closed end of cylinder bore 3, and the open end of piston 6 faces an electric motor 7.

Electric motor 7 is used for displacing piston 6 in cylinder bore 3 and is attached to motor side 4 of hydraulic block 2 so as to be coaxial to cylinder bore 3. A worm gear 8 is also positioned coaxially to cylinder bore 3, between electric motor 7 and piston 6; the largest portion of the length of the worm gear being accommodated in the piston 6 taking the form of a hollow piston, and a little of the worm gear protruding from hydraulic block 2. In the exemplary embodiment, worm gear 8 is a ball screw, which, however, is not essential to the present invention.

A planetary gear 9 in the form of a reduction gear is also positioned coaxially to cylinder bore 3, between electric motor 7 and worm gear 8. Worm gear 8 converts a rotary driving motion of electric motor and of planetary gear 9 to translation, by which piston 6 is displaced axially in cylinder bore 3 of hydraulic block 2. By displacing piston 6 in cylinder bore 3, a brake pressure is built up for operating hydraulic wheel brakes not shown, which are connected to hydraulic block 2 via brake lines. To control slip, brake fluid may be conveyed, that is, expelled from cylinder bore 3 or drawn into cylinder bore 3, by displacing piston 6 in cylinder bore 3.

A tubular nut 10 of the ball screw forming worm gear 8 is rotatably supported by a ball bearing 11 in a ring bearing 12, which projects into a depression 13 at the mouth of cylinder bore 3 and is secured by a spring washer 14, which is embedded externally in a circumferential groove in ring bearing 12 and internally in a circumferential surface of depression 13.

In the exemplary embodiment, ring bearing 12 is axially longer than ball bearing 11 is axially wide, and ring bearing 12 projects axially beyond ball bearing 11 in the direction of cylinder bore 3. Ring bearing 12 protrudes from depression 13, out of hydraulic block 2, at the mouth of cylinder bore 3, and supports ball bearing 11 outside of hydraulic block 2 in an axial manner with respect to cylinder bore 3. An axially longer ring bearing 12 allows ball bearing 11 to be shifted further outwards and allows, in connection with a longer piston 6 and/or a deeper cylinder bore 3, a piston stroke of piston 6 to be lengthened. An axially shorter ring bearing 12 allows ball bearing 11 to be positioned partially or completely in depression 13 at the mouth of cylinder bore 3, and allows the piston stroke to be shortened. For example, it is also possible to secure ball bearing 11 outside of hydraulic block 2, using a distance ring, which is set into depression 13, and on which ring bearing 12 is coaxially positioned (not shown).

To prevent piston 6 from rotating, hydraulic unit 1 includes a rotation prevention part 15, which encircles piston 6 on a part of its circumference. In the exemplary embodiment, rotation prevention part 15 has a cross section, which has the shape of a graduated circle, is constant over an axial length of rotation prevention part 15, and extends, in the exemplary embodiment, over somewhat more than half of the circumference of piston 6. Rotation prevention part 15 may also be semicircular or as having the shape of a semicylindrical dish; in the exemplary embodiment, it extending over somewhat more than half of the circumference.

Rotation prevention part 15 is situated in a widened section 16 of cylinder bore 3, on or in its mouth and/or in a base of depression 13. In the exemplary embodiment, widened section 16 is an annular step, which has a cross section congruent to rotation prevention part 15, and in which rotation prevention part 15 is situated and held in a rotatably fixed manner by a form-locked connection. The latter means that due to a form-locked connection with widened section 16, rotation prevention part 15 is unable to move in a circumferential direction of cylinder bore 3. Rotation prevention part 15 may be situated completely in widened section 16 or protrude from it.

Figure 2:
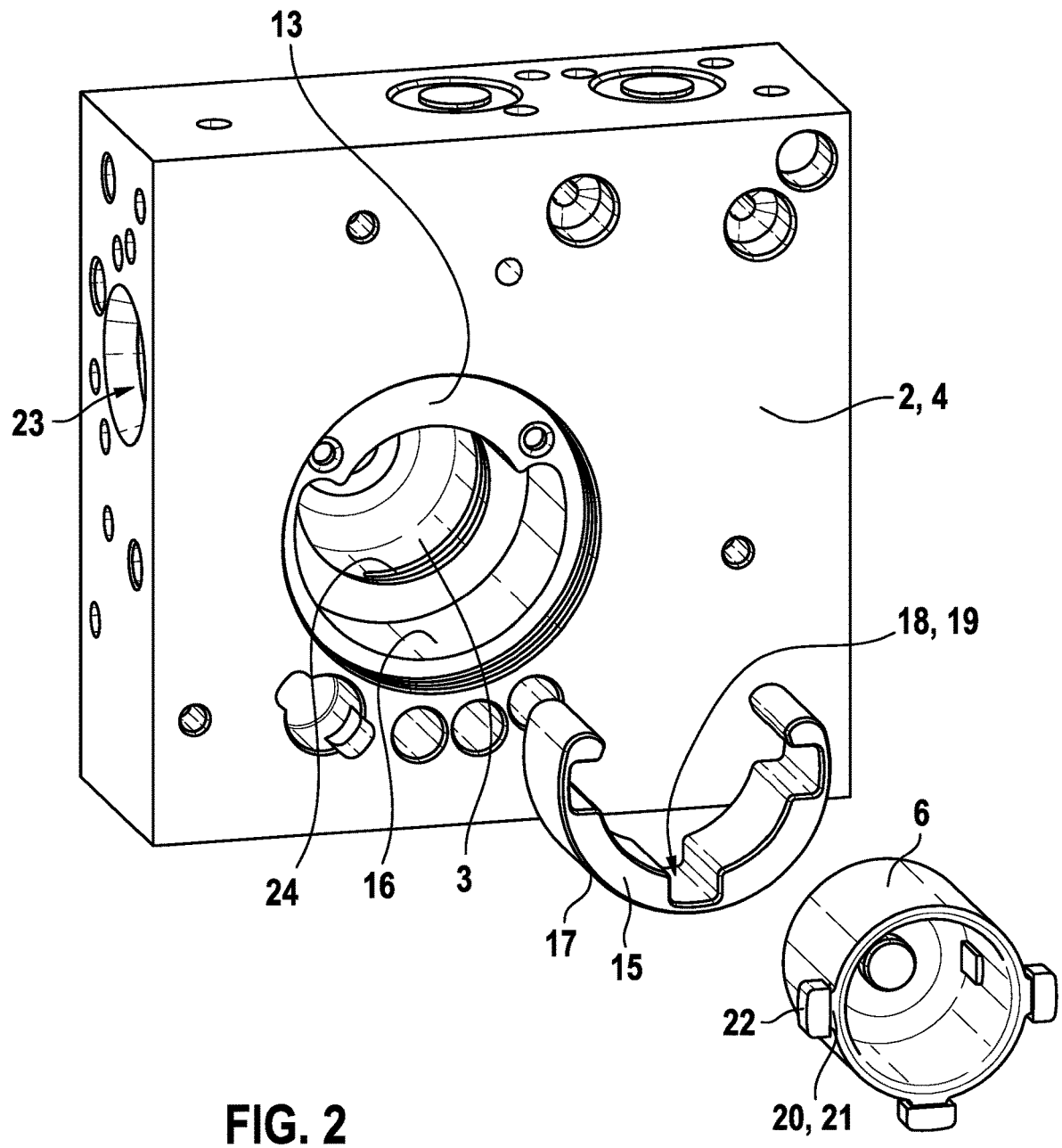
FIG. 2 shows an exploded perspective view of the hydraulic block from FIG. 1.
Figure 3:
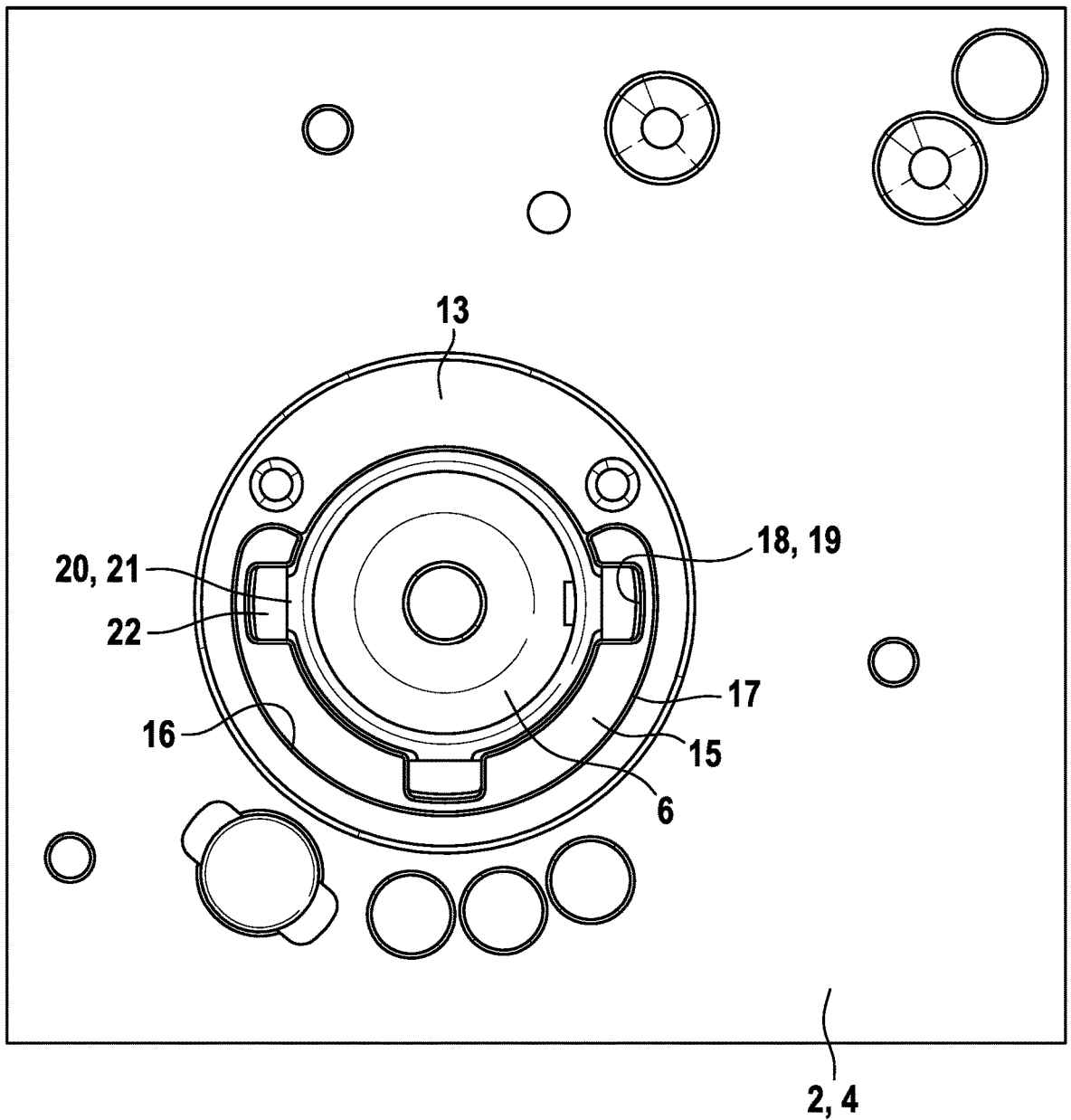
FIG. 3 shows a view of the hydraulic block from FIGS. 1 and 2.

For simple insertion into widened section 16, rotation prevention part 15 includes an insertion chamfer 17, that is, a beveled circumferential outer edge on an end face facing cylinder bore 3. Such an insertion chamfer 17 on an end face of rotation prevention part 15 opposite to cylinder bore 3 may be seen in FIG. 2.

Rotation prevention part 15 is secured in widened section 16 by peening, that is, by deforming hydraulic block 2 in a region surrounding widened section 16, at the base of depression 13. Hydraulic block 2 may be deformed at one or more points or continually at the circumference of widened section 16. The deformed region of hydraulic block 2 may overlap rotation prevention part 15 and, in this manner, retain it in widened section 16 by a form-locked connection and/or frictional connection.

Rotation prevention part 15 is primary-shaped. In the exemplary embodiment, it is made out of plastic, using injection molding. Other primary-shaping or other manufacturing methods and/or manufacturing from a different material are possible. For example, rotation prevention part 15 may be made of metal, using powder injection molding (metal injection molding (MIM)).

On its inner circumference, rotation prevention part 15 includes three rotation prevention grooves 18, which run axially parallelly, are each offset 90° from each other in the circumferential direction, and have a rectangular groove cross section. The number, layout, and shape of rotation prevention grooves 18, which may also be viewed, in general, as rotation prevention elements 19, may differ in specific embodiments of the present invention.

Shoulders 20, which project outwards from piston 6, which are situated, in the exemplary embodiment, at the open end of piston 6 facing electric motor 7, but which may also be provided at other positions of piston 6, engage with rotation prevention grooves 18. Shoulders 20 of piston 6 are supported in the two circumferential directions in rotation prevention groove 18 of rotation prevention part 15, and in this manner, they retain piston 6 in a rotatably fixed and axially displaceable manner. In general, shoulders 20 of piston 6 may also be viewed as counter-elements 21 of the rotation prevention grooves 18 of rotation prevention part 15, which form rotation prevention elements 19.

Sliding elements 22, which have, in the exemplary embodiment, the shape of a rectangular ring and are made, in particular, of plastic, are positioned on shoulders 20 of piston 6. Sliding elements 22 reduce friction between shoulders 20 and rotation prevention grooves 18 and reduce wear of shoulders 20 and rotation prevention grooves 18.

Figure 4:
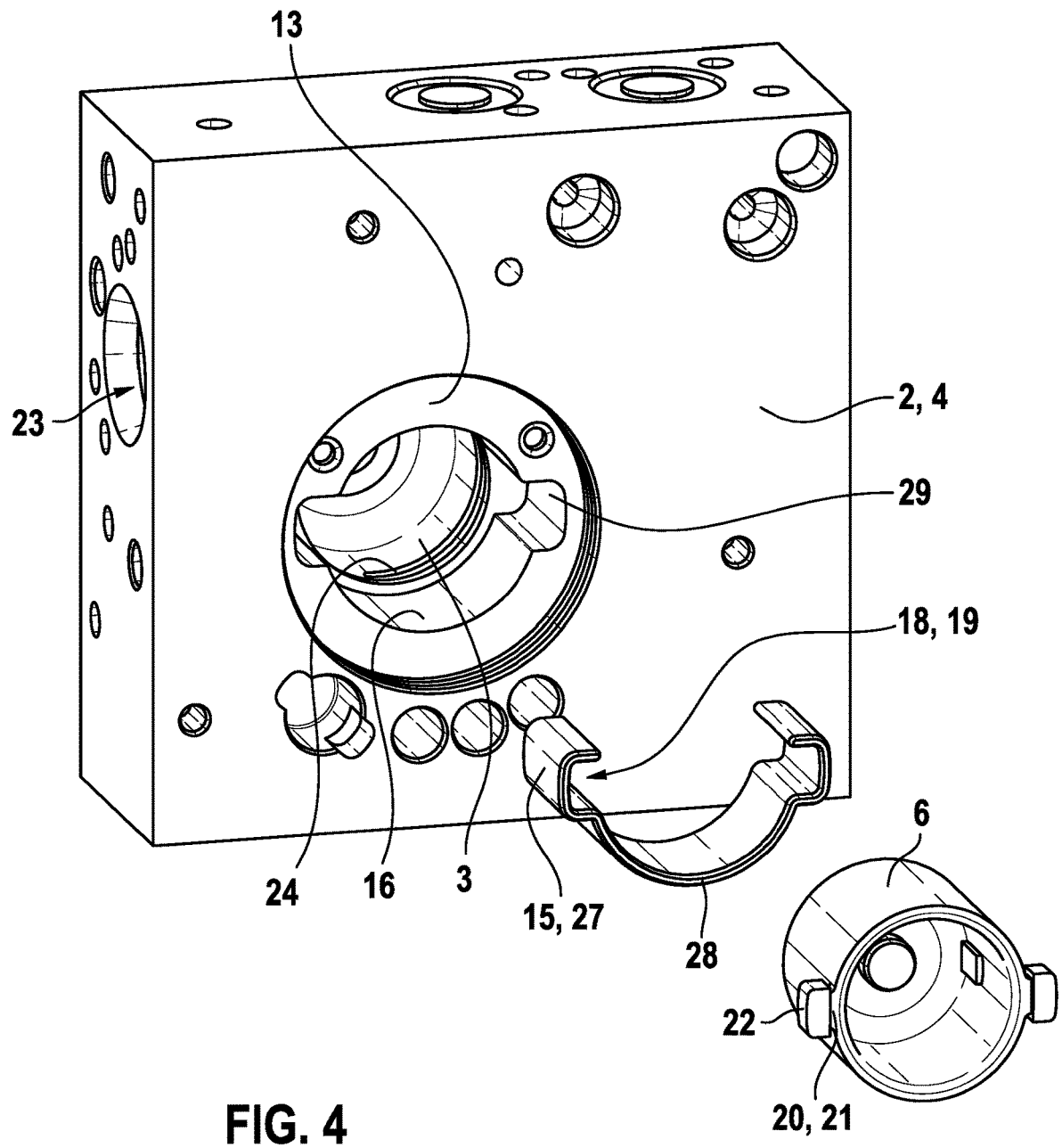
FIG. 4 shows an exploded perspective view of the hydraulic block corresponding to FIG. 2, including an alternative rotation prevention part.

FIG. 4 shows hydraulic block 2 having an alternative rotation prevention part 15. This rotation prevention part 15 includes two diametrically opposed, axially parallel C-profiles 27, which are joined on one end by a semicircular clip 28. Open sides of C-profiles 27 face each other and form rotation prevention grooves 18 or, in general, rotation prevention elements 19, with which shoulders 20 that project outwards, project outwards on the one end of piston 6, and form the counter-elements 21 for rotation prevention elements 19, engage, in order to prevent piston 6 from rotating. In this variant of the present invention, piston 6 includes two shoulders 20 projecting outwards. In order to mount rotation prevention part 15 in a rotatably fixed manner, using a form-locked connection, in this variant of the present invention, cylinder bore 3 includes a widened section 16 at the base of depression 13; the widened section being congruent to clip 28 of rotation prevention part 15; axially parallel grooves 29 for receiving C-profile 27 extending from the depression into cylinder bore 3.

In the specific embodiment of the present invention represented and described, hydraulic block 2 includes a master brake cylinder bore 23, in which a master brake cylinder piston not shown may be positioned; the master brake cylinder piston being mechanically displaceable in master brake cylinder bore 23 via a piston rod, using a foot brake pedal not shown or a hand brake lever.

A line 24 taking the form of a bore in hydraulic block 2 connects master brake cylinder bore 23 to cylinder bore 3. A valve (not shown) may be positioned in line 24.

Solenoid valves 25, which are situated on and/or in valve side 5 of hydraulic block 2 and are used for regulating and/or controlling the brake pressure, that is, wheel brake pressures, in the wheel brakes, are represented as circuit symbols in the drawing. Equipped with the components for externally-powered braking and for traction control, hydraulic block 2 forms hydraulic unit 1.

What is claimed is:
1. A hydraulic unit for a hydraulic vehicle brake system, the hydraulic unit comprising:
 a hydraulic block having a cylinder bore;
 an electric motor mounted to the hydraulic block on a side of the cylinder bore at which a mouth of the cylinder bore is located;
 a piston that includes at least one counter-element;
 a rotation prevention part; and
 a worm gear configured to be rotatably driven by the electric motor, and configured to convert an angular motion of the electric motor to a linear movement, by which the piston is axially displaceable in the cylinder bore;

wherein:
the cylinder bore includes a first axial region and a second axial region;
the second axial region includes the mouth of the cylinder bore;
the second axial region is radially wider than the first axial region due to a radial step in the second axial region formed by a radius of curvature of a first circumferential region of the second axial region being greater than a radius of curvature of a second circumferential region of the second axial region, the radial step forming an interior radially extending edge; and
the rotation prevention part:
is situated in the second axial region;
encircles a part of a circumference of the piston;
includes an exterior radially extending edge facing the interior radially extending edge of the second axial region of the cylinder bore and preventing rotation of the rotation prevention part by locking against the interior radially extending edge of the second axial region of the cylinder bore; and
includes at least one rotation prevention element that runs in a longitudinal direction of the cylinder bore and in which a respective one of the at least one counter-element of the piston is retained in a rotatably-fixed and longitudinally-displaceable manner.

2. The hydraulic unit as recited in claim 1, wherein the at least one rotation prevention element includes a plurality of rotation prevention elements distributed over a circumference of the rotation prevention part, and the at least one counter-element of the piston includes a plurality of counter-elements each supported in a respective one of the rotation prevention elements.

3. The hydraulic unit as recited in claim 1, wherein the rotation prevention part extends circumferentially at least one of (i) more than 180° and (ii) not more than approximately 230°.

4. The hydraulic unit as recited in claim 1, wherein:
the rotation prevention element is a groove that runs in the longitudinal direction of the cylinder bore; and
the counter-element is a shoulder that juts radially outwards from a circumference of a main body of the piston into the groove.

5. The hydraulic unit as recited in claim 1, wherein the rotation prevention part includes axially parallel C-profiles joined by a clip.

6. The hydraulic unit as recited in claim 1, wherein the rotation prevention part is produced by primary shaping.

7. The hydraulic unit as recited in claim 1, wherein the rotation prevention part includes an insertion chamfer on an end face.

8. The hydraulic unit as recited in claim 1, further comprising:
a friction-reducing and/or wear-reducing sliding element positioned between the rotation prevention element and the counter-element.

9. The hydraulic unit as recited in claim 1, wherein the rotation prevention part is secured in the mouth of the cylinder bore by deforming the hydraulic block in a region in the second axial region surrounding the rotation prevention part.

10. The hydraulic unit as recited in claim 1, wherein the piston is a hollow piston (a) that includes an open end that faces the electric motor and (b) in which the worm gear is at least partially accommodated.

11. The hydraulic unit as recited in claim 1, wherein the worm gear includes a pivot bearing that is positioned (a) coaxially to the cylinder bore and (b) either outside of the hydraulic block or on the hydraulic block so as to be partially in, and protrude partially out, of the cylinder bore.

12. A hydraulic unit for a hydraulic vehicle brake system, the hydraulic unit comprising:
a hydraulic block having a cylinder bore;
an electric motor mounted to the hydraulic block on a side of the cylinder bore at which a mouth of the cylinder bore is located;
a piston that includes a counter-element;
a rotation prevention part; and
a worm gear configured to be rotatably driven by the electric motor, and configured to convert an angular motion of the electric motor to a linear movement, by which the piston is axially displaceable in the cylinder bore;
wherein:
the cylinder bore has a first section and a second section;
the second section is wider than the first section and is located at the mouth of the cylinder bore;
the rotation prevention part is situated in the second section, encircles at least part of a circumference of the piston, and is rotatably locked by a form-fitting of a shape of the rotation prevention part to a shaped of the second section of the cylinder bore;
the rotation prevention part includes a rotation prevention element that runs in a longitudinal direction of the cylinder bore and in which the counter-element of the piston is supported in a rotatably-fixed and longitudinally-displaceable manner; and
the hydraulic unit includes at least one of the following features (a)-(c):
(a) the rotation prevention part extends circumferentially at least one of (i) more than 180° and (ii) not more than approximately 230°;
(b) the rotation prevention part includes axially parallel C-profiles joined by a clip; and
(c) a friction-reducing and/or wear-reducing sliding element is positioned between the rotation prevention element and the counter-element.

13. The hydraulic unit as recited in claim 12, wherein the rotation prevention part extends circumferentially at least one of (i) more than 180° and (ii) not more than approximately 230°.

14. The hydraulic unit as recited in claim 12, wherein the rotation prevention part includes the axially parallel C-profiles joined by the clip.

15. The hydraulic unit as recited in claim 12, wherein the hydraulic unit further comprises the friction-reducing and/or wear-reducing sliding element positioned between the rotation prevention element and the counter-element.

* * * * *